March 25, 1941.  J. H. ROETHEL  2,236,451
WINDOW GUIDE
Filed Sept. 2, 1939
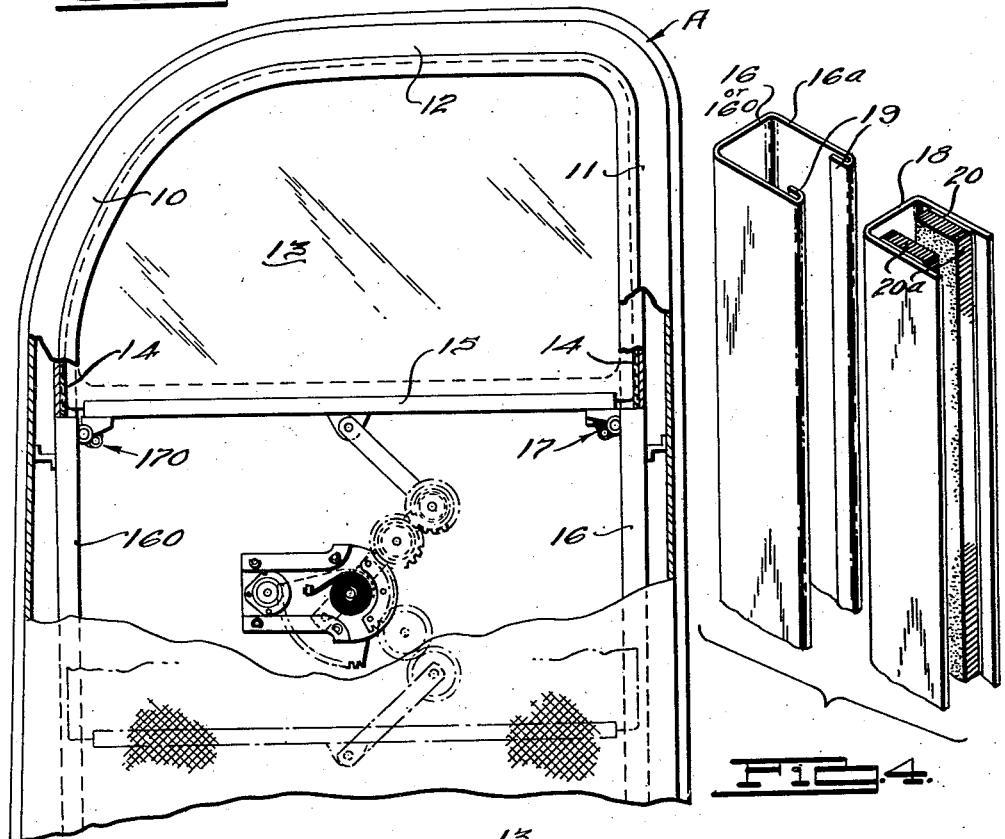
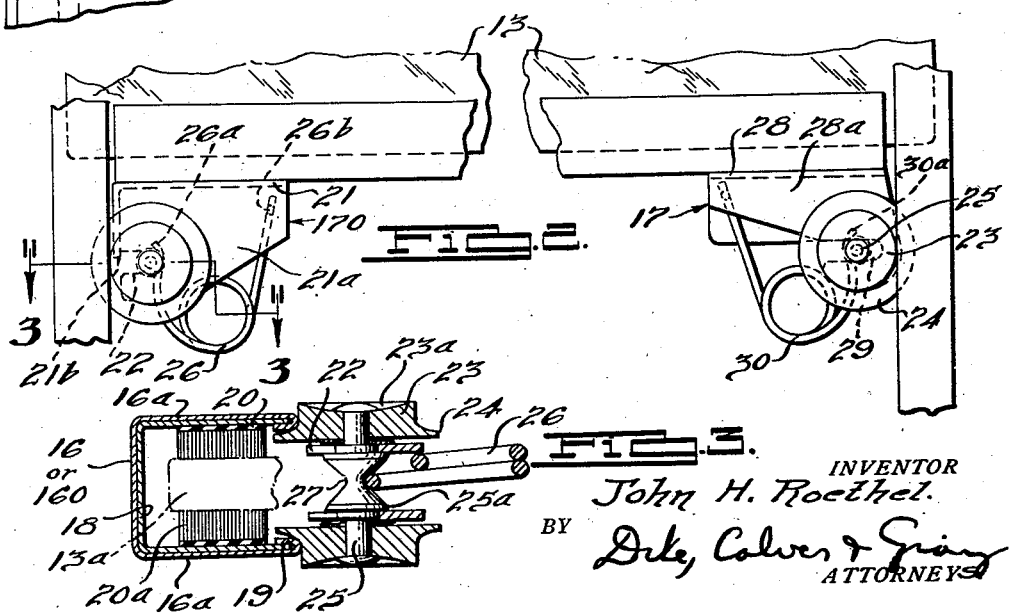
INVENTOR
John H. Roethel.
BY
Dike, Calver & Gray
ATTORNEYS Patented Mar. 25, 1941

2,236,451

UNITED STATES PATENT OFFICE 2,236,451

WINDOW GUIDE

John H. Roethel, Detroit, Mich., assignor to Marvel Equipment Corporation, Detroit, Mich., a corporation of Michigan Application September 2, 1939, Serial No. 293,254

18 Claims. (Cl. 296—44.5)

This invention relates to guiding and controlling means for glass or transparent panels of windows, particularly windows of automobiles, in which the said panels are adapted to be raised and lowered. The invention is especially useful as applied to the window structure for a vehicle body having a window frame of which the upper portion is in the form of a closed figure defining a window opening with a window well therebelow formed between inner and outer body or door panels within which the guiding mechanism of the present invention is installed and concealed from view.

An object of the invention is to provide improved guide mechanism within the window well of a vehicle body, which mechanism includes devices, such as rollers, adapted to be mounted on the bottom of the window panel at longitudinally spaced points and cooperable with fixed upright guides within the well, spring means of different strength being provided in association with the guide devices, and the construction being such that the window panel is capable of being displaced in one direction or normally held in one up and down guide position with respect to the guides by reason of the differential action of the spring means, thus improving the efficiency and effectiveness of the guiding mechanism and providing a more positive control of the window panel.

One important feature of the invention resides in the provision of guide devices, such as rollers, on the bottom of the sliding glass or window panel which are constructed and arranged to cooperate at all times and under all conditions with the fixed upright guides within the well whereby inaccuracies in production and in the installation of the guides are readily accommodated, any danger of the guide devices becoming disconnected from the guides is precluded, and at the same time undue frictional resistance to the travel of the window panel is reduced to a minimum.

Another object of the invention is to provide improved means for guiding the window glass into and out of the window opening and window well, which means is relatively simple in construction, capable of effecting substantial savings in material and labor costs, highly efficient in use and effective to permit and facilitate installation of the window glass from the side of the window opening downwardly into the window well.

Other objects of this invention will appear in the following description and appended claims, reference being had to the accompanying drawing forming a part of this specification wherein like reference characters designate corresponding parts in the several views.

Fig. 1 is an inner fragmentary side elevation, partly broken away and partly in section, of an automobile door embodying the invention.

Fig. 2 is an enlarged fragmentary side view illustrating the guiding means.

Fig. 3 is an enlarged section taken substantially through lines 3—3 of Fig. 2 looking in the direction of the arrows.

Fig. 4 is an enlarged fragmentary perspective view illustrating the construction of the channel guide.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there are illustrated certain embodiments of the invention applied, by way of example, to an automobile door. It will be understood, however, that the embodiments herein exemplified in part or in whole may be used in other relations and in other window structures, and in particular that the guiding means may be used generally in vehicle bodies or the like in connection with window panels which are adapted to be raised and lowered.

In Fig. 1 there is illustrated an automobile door A including upright side pillars 10 and 11 joined by a header 12, thus providing a window frame in the form of a closed figure defining a main window opening adapted to be closed by means of a vertically slidable glass or other transparent panel 13. The window framing may be provided with grooves or glass runway channels 14, terminating at the bottom of the window opening, and designed to receive the edges 13a of the panel 13.

Secured to the lower edge of the glass panel 13 is a channel bar or glass retainer member 15 to which the window regulator is adapted to be connected as hereinafter described. The window panel 13 is guided within the window well through the medium of similar spaced upright channel guides 16 and 16a fixed in any suitable manner within the window well, the channel member 15 carrying guide devices at opposite ends thereof, generally indicated by the numerals 17 and 17a, which travel upon the fixed guides 16 and 16a.

As shown in Fig. 3 each guide 16 and 16a is in the form of a channel having a base and inwardly extending parallel flanges 16a. Within each guide 16 is mounted a channel strip 18 which is held therein by reason of its marginal edges abutting against the inturned flanges 19 at the outer edges of the flanges 16a. The insert channel strip 18 may be installed by telescoping it through the end of the channel 16 after the flanges 19 have been formed. If desired the flanges 19 may be folded tight against the walls 16a and the side walls of the insert 18 made of a width to cause its marginal edges to abut the marginal edges of folds 19 so that when telescoped into the channel guide the side walls of insert 18 will lie in the plane of the folds 19. The insert 18 has secured to the inner opposed faces thereof rubber strips 20 which preferably carry a fibrous pile fabric 20a adapted to engage and cushion the side edges 13a of the glass panel 13.

The guide device or roller guide unit 17a at one end, such as the forward end, of the window panel comprises an inverted channel bracket 21 provided with downturned parallel side flanges 21a, the upper central web of the bracket being preferably spot welded to the bottom of the channel 15. The side flanges 21a are provided with parallel horizontal slots 22 closed at the rear ends thereof and opening at the forward edges of the flanges 21a. The bracket 21 carries a roller device which comprises a pair of laterally spaced annular roller elements 23 engageable with the parallel tracks or rails formed by the turned edges 19 of the channel guide 16 or 16a. Adjacent each roller element 23 is an annular flange 24 which projects into the channel guide and overlaps the inner edge portions of the flanges 16a. The roller elements 23 may be integrally or otherwise connected by a shaft portion 25. In the present instance the shaft 25 is formed separately from the roller elements 23, having reduced ends extending centrally therethrough and riveted over at the ends of the shaft within countersunk portions 23a of the roller elements. The central portion of the shaft is enlarged and this portion is turned down centrally at 27 to a relatively narrow diameter at which point the shaft is engaged by one end 26a of a tension spring 26 which may comprise a length of spring wire having one or more intermediate coils. The opposite end 26b of the spring is hooked through an aperture in one of the flanges 21a of the bracket. The annular parts of the shaft portion 25a at opposite sides of the constricted portion 27 are of sufficient diameter to overlap the edges of the slots 22, and adjacent thereto the shaft is provided with annular portions, as shown, having a sliding fit within the guide slots 22. Interposed between the roller elements 23 and the ends of the bracket flanges 21a which extend between the rollers are spring anti-rattle washers.

The guide device or rollers guide unit 17 at the opposite end, such as the rear end, of the window panel may comprise a bracket 28 also in the form of an inverted channel piece having its central web spot welded to the bottom of the channel member 15. This bracket 28 has downturned spaced parallel flanges similar to the bracket 21 and these flanges are provided with parallel horizontal slots 29 reversed with respect to the slots 22 so that the inner ends of the slots are open and the outer ends are closed. The roller unit carried by the bracket 28 may be the same as the roller unit carried by the bracket 21, the flanged rollers 23, 24 in like manner being carried by a shaft 25 slidable within the slots 29, the central reduced portion 27 of the shaft 25 in this instance being engaged by one end 30a of a tension spring 30. Although the spring 30 is similar to the spring 26 it is preferred that the spring 30 be formed of heavier spring wire so as to exert greater force or effort upon the shaft 25 of the roller unit carried by the bracket 28. In other words, as herein exemplified by way of example, the effort exerted by the spring 30 is greater than the effort exerted by the spring 26. Hence, during normal operation as the window panel 13 is raised and lowered the spring 30 will hold the window over so that the shaft 25 at the left in Fig. 2 will be forced back against the action of spring 26 to the closed ends of the slots 22.

The spring 30, after assembling the window panel, is at all times under tension and the shaft 25 at the right in Fig. 2 will normally occupy an intermediate position in the slots 29 as shown in said figure. Thus, since the effort of spring 30 will overcome the effort of spring 26 the roller engaged by the latter spring will normally operate as a solid unsprung roller. However, in the event of unusual pressure of the right hand roller 24 in Fig. 2 against the channel guide 16, such as by reason of a longitudinal force against the window glass or the cramping action or frictional drag of a window regulator, which will result in forcing the shaft 25 back against the spring 30, the opposite roller will not become disconnected from its channel guide 16 or fail to track thereupon since in such instance the spring 26 will move the roller shaft within the slots 22 and yieldingly hold the roller at all times in engagement with the tracks of the channel guide. Although the glass is spring suspended within the well by spring influenced guide roller devices, normally, however, one of the rollers, which is engaged by the lighter spring, will travel solidly against the channel guide and thus maintain one upright edge of the window glass in predetermined alinement or position. It will be seen in Fig. 2 that an abutment 21b projects into the open end of the slots 22 so as to limit the travel of the roller shaft within these slots. If desired a similar stop at the extreme open ends of the slots 29 may be provided to limit extreme retraction of the opposite roller shaft.

Any suitable window regulator may be utilized for raising and lowering the window panel 13. In the present instance there is indicated in Fig. 1 a window regulator of the single arm center point lift type having the outer end of its swinging lifting arm pivotally connected to a depending bracket secured centrally to the glass retainer channel 15. It will be understood that any other suitable window regulator of the single arm or two arm type or otherwise may be utilized, and since the window regulator per se forms no part of the present invention no further description thereof is deemed necessary herein.

I claim:

1. A guide structure for a vehicle window panel adapted to be mounted in a window frame for up and down sliding movement said window frame having a well; said guide structure including a pair of guide devices adapted to be fixed to the bottom of the window panel at longitudinally spaced points, each device including a longitudinally bodily movable compression element adapted to travel upon a fixed upright guide within the well, a spring acting against each element to press it against the guide, one of said springs exerting greater effort than the other spring, and means for limiting the retractive movement of one element against its spring caused by the longitudinal displacement of the window panel under the effort exerted by the heavier spring against the other element.

2. In a guide structure for a vehicle window panel adapted to be mounted in a window frame for up and down sliding movement, said window frame having a window opening and a well therebelow and said window panel having a guide device at one end of the bottom edge thereof; an upright guide adapted to be fixed within the well adjacent an upright edge of the window panel, said guide comprising a metallic channel strip providing a base and a pair of spaced flanges adapted to extend from the base longitudinally into the well and terminating in spaced substantially parallel tracks formed by inturned edge portions of the flanges, said inturned edge portions being substantially parallel to the flanges, and a second relatively rigid channel strip fitting within said guide and having its marginal edges abutting said inturned edge portions and wholly held in position thereby, said second channel strip having non-metallic material on an inner face or faces thereof adapted to be engaged by the edge of the window panel as the latter travels downwardly or upwardly through the guide.

3. A guide structure for a vehicle window panel adapted to be mounted in a window frame for up and down sliding movement, said window frame having a well; said guide structure including a pair of guide devices adapted to be fixed to the bottom of the window panel at longitudinally spaced points, each device including a longitudinally bodily movable compression roller adapted to travel upon a fixed upright guide within the well, spring means acting against each roller to press it against the guide, one of said spring means exerting greater effort than the other spring means, and means for limiting the retractive movement of one roller against its spring means caused by the longitudinal displacement of the window panel under the effort exerted by the heavier spring means against the other roller.

4. A channel guide for a sliding vehicle window panel adapted to be mounted in a window well adjacent an upright edge of said panel, comprising a metallic channel strip providing a base and a pair of spaced flanges adapted to extend from the base longitudinally into the well and terminating in spaced substantially parallel tracks formed by inturned edge portions of the flanges, and a second relatively rigid channel strip fitting within said guide and having its marginal edges abutting said inturned edge portions and wholly held in position thereby, said second channel strip having non-metallic material on an inner face or faces thereof adapted to be engaged by the edge of the window panel as the latter travels downwardly or upwardly through the guide.

5. A guide structure for a vehicle window panel adapted to be mounted in a window frame for up and down sliding movement, said window frame having a well; said guide structure comprising a pair of fixed upright guides adapted to be mounted in the well at longitudinally spaced points, each guide comprising a metallic strip providing a base and a flange portion extending longitudinally from the base within the well and terminating in a track, a pair of longitudinally spaced guide devices mounted exteriorly of a member adapted to be secured to the bottom of the window panel and each comprising transverse shaft means, roller means thereon adapted to run on a track, a support for the shaft means and roller means, spring means urging each roller means against its track, one of said spring means exerting greater effort than the other spring means, and means for limiting the retractive movement of one device against its spring means caused by the longitudinal displacement of the window panel under the effort exerted by the heavier spring means against the other device.

6. A guide structure for a vehicle window panel adapted to be mounted in a window frame for up and down sliding movement, said window frame having a well; said guide structure comprising a pair of fixed upright guides adapted to be mounted in the well at longitudinally spaced points, each guide comprising a metallic channel strip providing a base and a flange portion extending longitudinally from the base within the well and terminating in spaced parallel tracks, a pair of longitudinally spaced guide devices mounted exteriorly of a member adapted to be secured to the bottom of the window panel and each comprising transverse shaft means, roller means thereon adapted to run on a track, a support for the shaft means and roller means, a spring urging each roller means against its track, one of said springs exerting greater effort than the other spring, and means for limiting the retractive movement of one device against its spring caused by the longitudinal displacement of the window panel under the effort exerted by the heavier spring against the other device.

7. A guide structure for a vehicle window panel adapted to be mounted in a window frame for up and down sliding movement, said window frame having a well; said guide structure comprising a pair of fixed upright guides adapted to be mounted in the well at longitudinally spaced points, each guide comprising a metallic channel strip providing a base and a pair of substantially parallel flange portions extending longitudinally from the base within the well and terminating in substantially parallel spaced tracks, a pair of longitudinally spaced roller guide devices mounted exteriorly of a member adapted to be secured to the bottom of the window panel and each comprising a transverse shaft, spaced rollers on the shaft adapted to run on the tracks, a spring urging the rollers against the tracks, a support for the shaft and rollers mounted exteriorly of the flange portions, one of said springs exerting greater effort than the other spring, and means for limiting the retractive movement of one device against its spring caused by the longitudinal displacement of the window panel under the effort exerted by the heavier spring against the other device.

8. A guide structure for a vehicle window panel adapted to be mounted in a window frame for up and down sliding movement, said window frame having a well; said guide structure comprising a pair of fixed upright guides adapted to be mounted in the well at longitudinally spaced points, each guide comprising a metallic channel strip providing a base and flange portions extending longitudinally from the base within the well and terminating in substantially parallel spaced tracks, a pair of longitudinally spaced roller guide devices mounted exteriorly of a member adapted to be secured to the bottom of the window panel and each comprising a transverse shaft, spaced rollers on the shaft adapted to run on the tracks, means associated with the rollers and overlapping the flange portions adjacent the tracks for maintaining the rollers and window panel against transverse displacement relative to the guide, a spring urging the rollers against the tracks, a support for the shaft, rollers and said means mounted exteriorly of the flange portions of the upright guide, one of said springs exerting greater effort than the other spring, and means for limiting the retractive movement of one device against its spring caused by the longitudinal displacement of the window panel under the effort exerted by the heavier spring against the other device.

9. A guide structure for a vehicle window panel adapted to be mounted in a window frame for up and down sliding movement, said window frame having a window opening and a well therebelow; said guide structure comprising a pair of fixed upright guides within the window well adjacent opposite upright edges of the window panel, each guide comprising a metallic channel strip providing a base and a pair of spaced flanges extending from the base longitudinally into the well and terminating in spaced substantially parallel tracks, a guide device mounted on the bottom of the window panel at each end thereof including a support and a roller element movable horizontally in a guideway in the support toward and from a guide and adapted to travel along the guide in a generally vertical direction, a spring cooperable with each roller element to urge it toward its guide, one spring being stronger to exert sufficiently greater effort upon its roller element than the other and weaker spring upon its roller element thereby normally to force the latter roller element to one limit of its guideway away from its cooperating guide.

10. A guide structure for a vehicle window panel adapted to be mounted in a window frame for up and down sliding movement into and out of a window well, said guide structure including a pair of longitudinally spaced guide devices adapted to be mounted on the bottom of the window panel, spring means urging each guide device in a longitudinal direction and each device adapted to travel along a fixed upright guide within the well, one of said spring means being sufficiently stronger than the other spring means to urge the guide device for the latter spring means to substantially one limit of its longitudinal movement.

11. A guide structure for a vehicle window panel adapted to be mounted in a window frame for up and down sliding movement into and out of a window well, said guide structure including a pair of longitudinally spaced guide devices adapted to be mounted on the bottom of the window panel, spring means urging each guide device in a longitudinal direction and each device adapted to travel along a fixed upright guide within the well, one of said devices having a limit of longitudinal movement against its spring means in one direction, said other spring means exerting greater effort to move said last named device to said limit.

12. A guide structure for a vehicle window panel adapted to be mounted in a window frame for up and down sliding movement into and out of a window well, said guide structure including a pair of longitudinally spaced guide devices adapted to be mounted on the bottom of the window panel, spring means urging each guide device in a longitudinal direction and each device adapted to travel along a fixed upright guide within the well, one of said spring means being materially stronger than the other spring means to displace the window panel in one longitudinal direction and retract the guide device having the weaker spring means, and a stop effective normally to limit retraction of said last named guide device.

13. A guide structure for a vehicle window panel adapted to be mounted in a window frame for up and down sliding movement into and out of a window well, said guide structure including a pair of longitudinally spaced guide devices adapted to be mounted on the bottom of the window panel, spring means urging each guide device in a longitudinal direction and each device adapted to travel along a fixed upright guide within the well, one of said spring means being materially stronger than the other spring means to displace the window panel in one longitudinal direction and retract the guide device having the weaker spring means to one limit of its longitudinal movement or substantially so.

14. A guide structure for a vehicle window panel adapted to be mounted in a window frame for up and down sliding movement into and out of a window well, said guide structure including a pair of longitudinally spaced roller guide devices adapted to be mounted on the bottom of the window panel, spring means urging each roller guide device in a longitudinal direction and each device adapted to travel along a fixed upright guide within the well, one of said spring means being sufficiently stronger than the other spring means to urge the guide device for the latter spring means to substantially one limit of its longitudinal movement.

15. A guide structure for a vehicle window panel adapted to be mounted in a window frame for up and down sliding movement into and out of a window well, said guide structure including a pair of longitudinally spaced roller guide devices adapted to be mounted on the bottom of the window panel, spring means urging each roller guide device in a longitudinal direction and each device adapted to travel along a fixed upright guide within the well, one of said devices having a limit of longitudinal movement against its spring means in one direction, said other spring means exerting greater effort to move said last named device to said limit.

16. A guide structure for a vehicle window panel adapted to be mounted in a window frame for up and down sliding movement into and out of a window well, said guide structure including a pair of longitudinally spaced roller guide devices adapted to be mounted on the bottom of the window panel, spring means urging each roller guide device in a longitudinal direction and each device adapted to travel along a fixed upright guide within the well, one of said spring means being materially stronger than the other spring means to displace the window panel in one longitudinal direction and retract the guide device having the weaker spring means normally to a predetermined limit.

17. A guide structure for a vehicle window panel adapted to be mounted in a window frame for up and down sliding movement into and out of a window well, said guide structure comprising longitudinally spaced fixed upright guides adapted to be mounted in the well, longitudinally spaced guide devices adapted to be mounted on the bottom of the window panel for travel on said guides, spring means urging each device in a longitudinal direction, one spring means exerting materially greater effort than the other spring means to displace the guide device associated with said last named spring means in a longitudinal direction normally to a predetermined limit.

18. A guide structure for a vehicle window panel adapted to be mounted in a window frame for up and down sliding movement into and out of a window well, said guide structure comprising longitudinally spaced fixed upright guides adapted to be mounted in the well, longitudinally spaced guide devices adapted to be mounted on the bottom of the window panel for travel on said guides, spring means urging each device in a longitudinal direction, one spring means exerting materially greater effort than the other spring means to displace the guide device associated with said last named spring means in a longitudinal direction normally to a predetermined limit, at least one of said guide devices comprising spaced roller elements having each a projecting annular flange overlying a side of the adjacent guide.

JOHN H. ROETHEL.